(12) United States Patent
Carlsson et al.

(10) Patent No.: US 8,627,548 B2
(45) Date of Patent: Jan. 14, 2014

(54) ALIGNING MULTIPLE PIVOT PIN SYSTEM AND METHOD THEREFOR

(75) Inventors: Anders Carlsson, Atvidaberg (SE); Nicklas Ericsson, Husqvarna (SE)

(73) Assignee: Expander System Sweden AB, Atvidaberg (SE)

( * ) Notice: Subject to any disclaimer, the term of this patent is extended or adjusted under 35 U.S.C. 154(b) by 20 days.

(21) Appl. No.: 13/462,270

(22) Filed: May 2, 2012

(65) Prior Publication Data

US 2012/0279014 A1    Nov. 8, 2012

Related U.S. Application Data

(60) Provisional application No. 61/482,101, filed on May 3, 2011.

(51) Int. Cl.
*E05D 5/10* (2006.01)
(52) U.S. Cl.
USPC .......................................................... 16/386
(58) Field of Classification Search
USPC ............ 16/75, 250, 253, 257, 273, 277, 282, 16/299, 303, 355–356, 366, 377, 386
See application file for complete search history.

(56) References Cited

U.S. PATENT DOCUMENTS

| | | | | |
|---|---|---|---|---|
| 2,051,428 A | * | 8/1936 | Tatlow | 16/273 |
| 3,591,669 A | * | 7/1971 | Memory | 264/101 |
| 4,491,436 A | * | 1/1985 | Easton | 403/122 |
| 4,634,299 A | * | 1/1987 | Svensson | 384/271 |
| 4,695,073 A | | 9/1987 | Pettibone et al. | |
| 5,584,100 A | * | 12/1996 | Doyle et al. | 16/301 |
| 5,706,556 A | * | 1/1998 | Kluting | 16/273 |
| 6,484,363 B1 | | 11/2002 | Chung | |
| 2004/0165939 A1 | | 8/2004 | Marche | |
| 2009/0199365 A1 | * | 8/2009 | Svensson et al. | 16/386 |
| 2009/0250581 A1 | * | 10/2009 | Svensson et al. | 248/309.2 |
| 2010/0037429 A1 | * | 2/2010 | Tang | 16/250 |

FOREIGN PATENT DOCUMENTS

DE    3729102    4/1988
DE    102005062649    5/2007

* cited by examiner

*Primary Examiner* — Roberta Delisle
(74) *Attorney, Agent, or Firm* — Weiss & Moy, P.C.; Jeffrey D. Moy

(57) ABSTRACT

A multi-pivot pin system has a hinge assembly having a plurality of housings formed within the hinge assembly. A channel is formed through each housing wherein an outer diameter center-line of the hinge assembly is off-set from a center-line of an inner diameter of the channel. A rotating device is positioned in each channel.

20 Claims, 4 Drawing Sheets

ALIGNING MULTIPLE PIVOT PIN SYSTEM AND METHOD THEREFOR

RELATED APPLICATIONS

This patent application claims the benefit of U.S. Provisional Application No. 61/482,101, filed May 3, 2011, entitled "ALIGNING MULTIPLE PIVOT PINS SYSTEM" in the name of the same inventors, and which is incorporated herein by reference in its entirety

BACKGROUND

This invention relates generally to a pivot system that allows two machine element members to pivot around multiple pivot pins axis, and more specifically, to an expandable axis align-able pivot system with component lock/unlock function.

The conventional way to achieve pivotability in a connection between two rigid machine parts is to use a hinge journal led in bearings. Hinge journal led in bearings may comprise one or more bearings arranged inside one machine member and a cylindrical pin hinging through the bushing and a pair of mounting lugs also known as lug-ears. When the pivot ability is accomplished through more than one cylindrical pin, the alignment of the center line of these cylindrical pins is critical to the functionality of the pivot joint and the wear life of the components. The distance between these multiple pivot pins contributes greatly to the challenges to manufacture the bearings and the mounting lugs in a single aligned straight line.

Design solutions exist, however all of them consist of compromise, either in wear, integrity, cost to produce or downright acceptance of early failure. In most instances, the challenge results in additional freedom for the cylindrical pins to move in the lug-ears. This produces unwarranted wear and safety implications.

Another solution to the above issues is to make either the lugs or the bearings adjustable to accommodate the out of line manufacturing process. Unfortunately, this substantially increases the cost and reduces the safety and integrity of the pivot junction. Thus, current solutions are a compromise of strength and integrity and wear-resistance of the pivot junctions.

Therefore, it would be desirable to provide a system and method that overcomes the above.

SUMMARY

A multi-pivot pin system has a hinge assembly having a plurality of housings formed within the hinge assembly. A channel is formed through each housing wherein an outer diameter center-line of the hinge assembly is off-set from a center-line of an inner diameter of the channel. A rotating device is positioned in each channel A multi-pivot pin system has a hinge assembly having a plurality of housings formed within the hinge assembly. The hinge assembly comprises a base member having the plurality of housings and a hinged member having a plurality of leg members. A plurality of pair of lug ears are on the hinged member, wherein each pair of lug ears form a housing, the leg members positioned in each housing. A channel is formed through each housing wherein an outer diameter center-line of the hinge assembly is off-set from a center-line of an inner diameter of the channel. A rotating device is positioned each channel.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
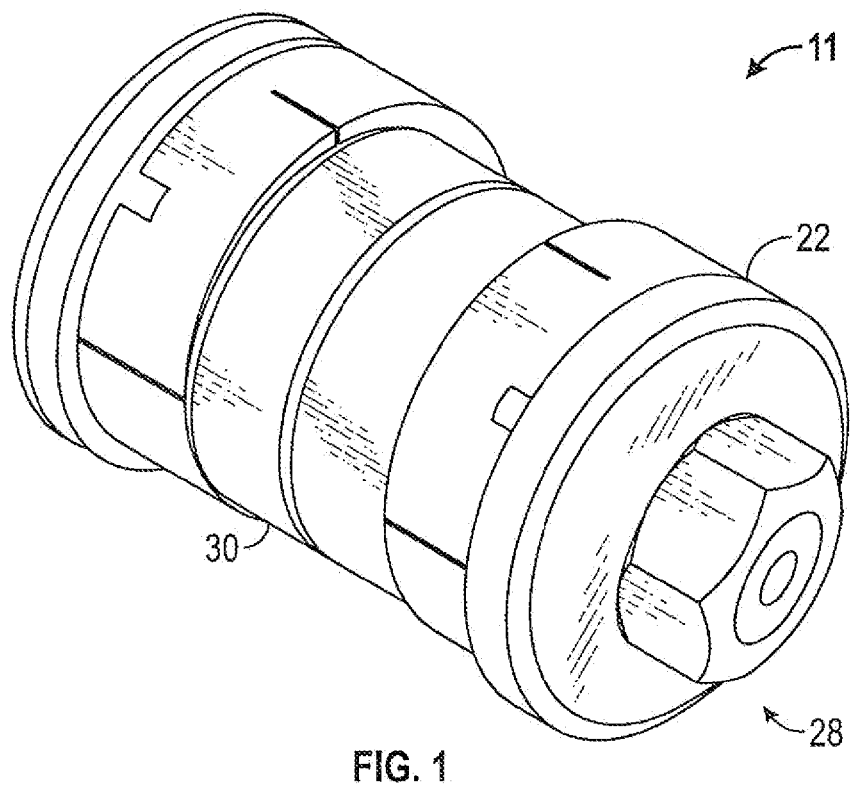
FIG. 1 is a elevated perspective view of an axle assembly having a traditional straight pin for use in a multiple pivot pin system.

Referring now to the Figures, a pivot system 10 that allows two machine element members to pivot around multiple pivot pins axis is shown. Alignment for this invention consists at least of two types: Alignment of multiple center-lines of multiple pivot components and the alignment of the angle of the center-line around which the pivot hinge moves.

The pivot system 10 has a support hinge 12. The support hinge 12 is configured so that an outer diameter center-line is off-set from a center-line of an inner diameter as will be explained below. The support hinge 12 is a split design having a first half 12A and a second half 12B. In general the first half 12A is a hinged section which rotates about the second section 12B which is a base section.

The support hinge 12 may have a hollow interior section 12D. A plurality of housings 13 may be formed with the interior section 12D of the support hinge 12. Each housing 13 has openings 15 formed there through. The housing 13 may be used to hold a bushing 14 or a bearing (hereinafter bushing 14). In general, the openings 15 may be aligned. A pivot pin 20 (hereinafter pin 20) may be positioned through a pair of openings 15 and the bushing 14. As stated above, the outer diameter center-line A of the support hinge 12 is off-set from a center-line of an inner diameter B of the opening 15.

In the embodiment shown, the housing 13 may be formed as follows. The first half 12A may have a plurality of leg members 12C. The leg members 12C may form one or more hollow interior sections 12D within the support hinge 12. Each leg member 12C may have the opening 15 which may be used to house the bushing 14. As stated above, the support hinge 12 is designed so that the outer diameter center-line A of the support hinge 12 is off-set from the center-line of an inner diameter B of the opening 15 formed in the leg member 12C.

In accordance with one embodiment, the second section 12B further has a plurality of lug ears 18. The lug ears 18 may be used to secure a pin 20 which is positioned through the bushing 14. In general, each bearing 14 has a corresponding pin 20.

As may be seen in the Figures, the lug ears 18 may be grouped in pairs. Each pair of lug ears 18 may be spaced apart to form a gap designed to house each bushing 14 and leg member 12C. Each lug ear 18 may have an opening 18A which may be used to allow the pin 20 to be position through the bearing and secured. In accordance with one embodiment, the opening 18A may be tapered.

The problem is to manufacture the two hinge parts 12A and 12B in line with each other, due to a long distance between the outer pivots and therefore impossible for line-boring. Main forces are taken also by the two outer pivots. The alignment problem is either with the outer leg-members 12C of the mid-section 12A or the outer lug-ears 18 in section 12B. The invention allows individual adjustment of the two outer pivots.

Figure 2:
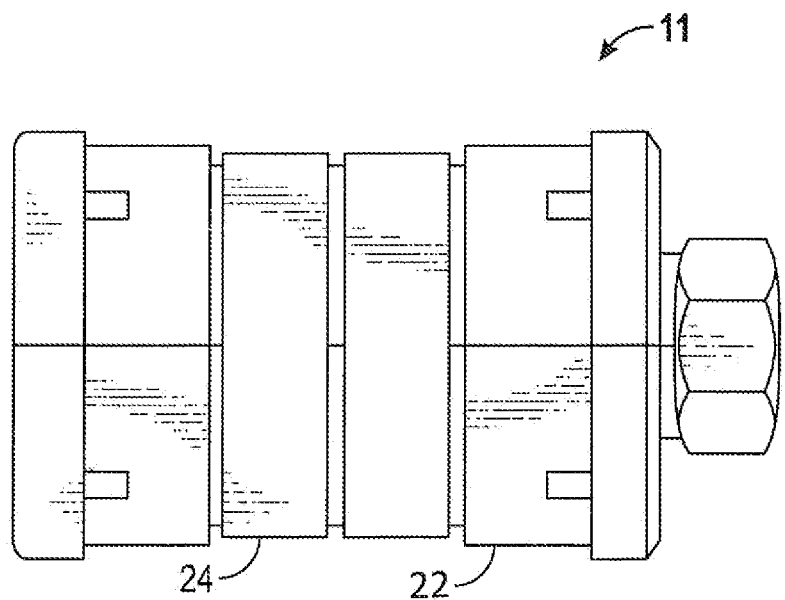
FIG. 2 is a side view of the axle assembly for the multiple pivot pin system.
Figure 3:
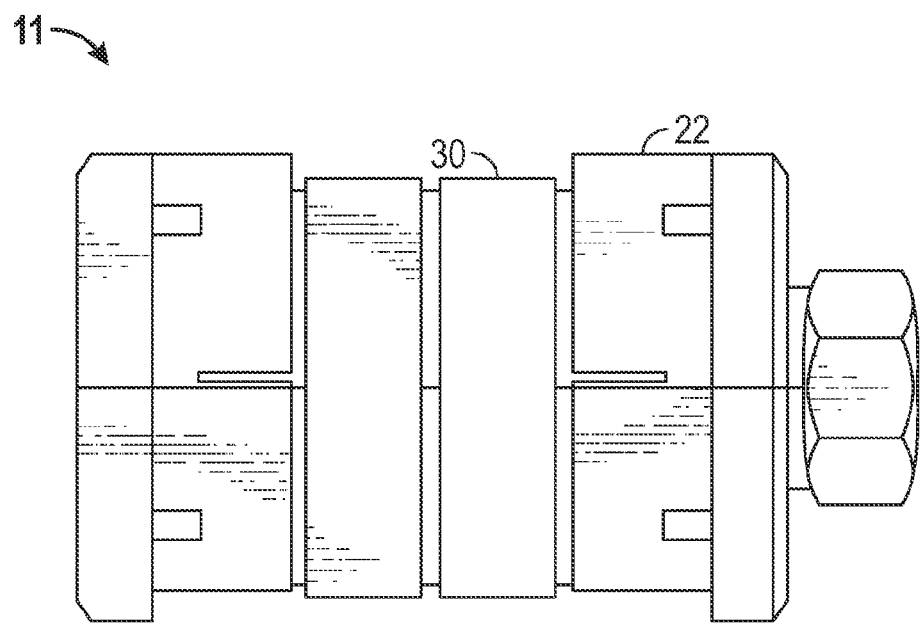
FIG. 3 is a side view of the axle assembly for the multiple pivot pin system in an upright position.
Figure 4:
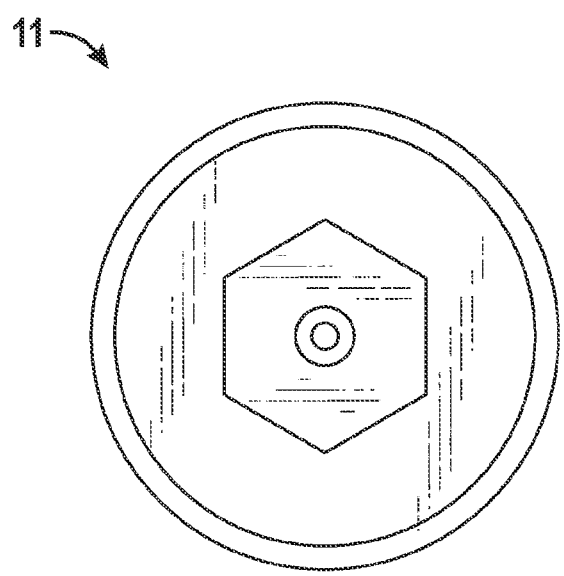
FIG. 4 is a top view of the axle assembly for the multiple pivot pin system.
Figure 5:
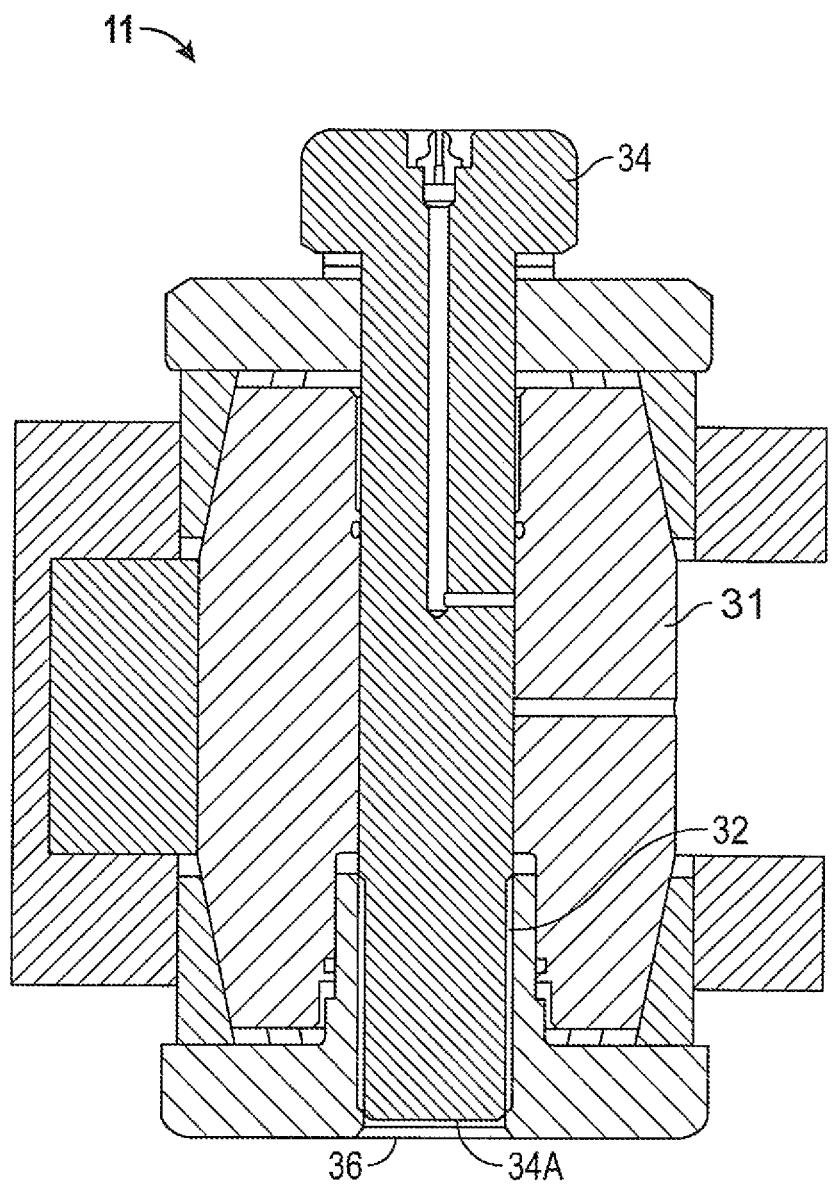
FIG. 5 is a cross-sectional view of the axle assembly for the multiple pivot pin system
Figure 6:
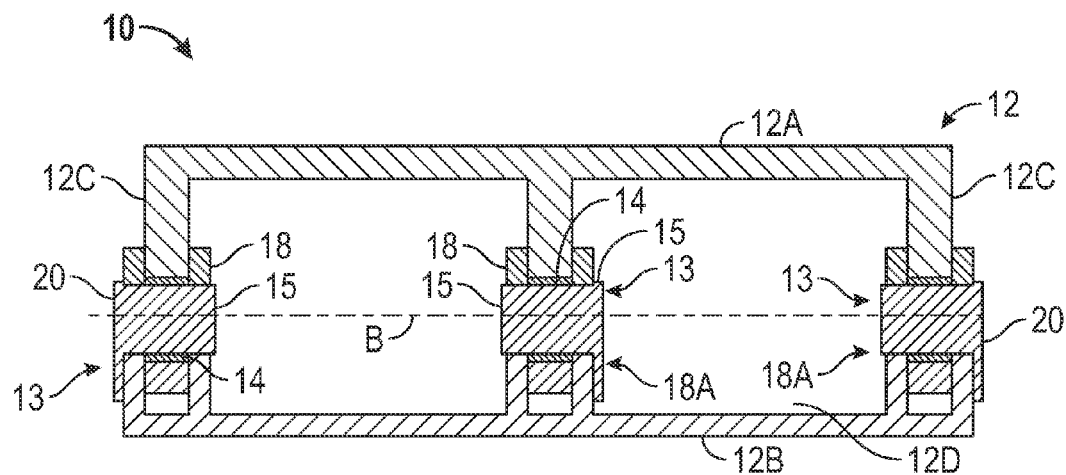
FIG. 6 is a cross-sectional view of the hinge of the multiple pivot pin system
Figure 7A:
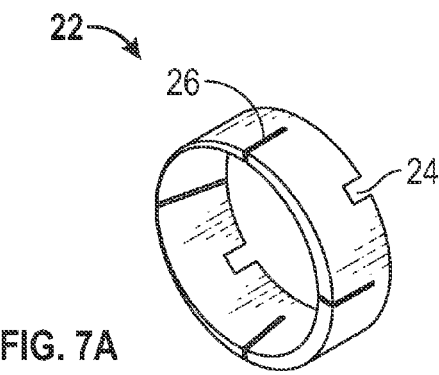
FIG. 7a-7F show a plurality of views of the locking sleeves used in the multiple pivot pin system.
Figure 7B:
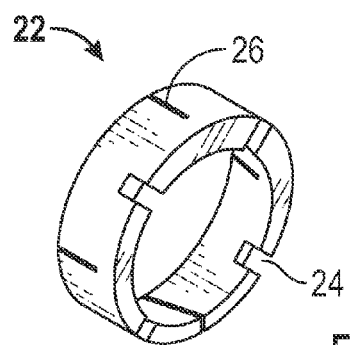
Figure 7C:
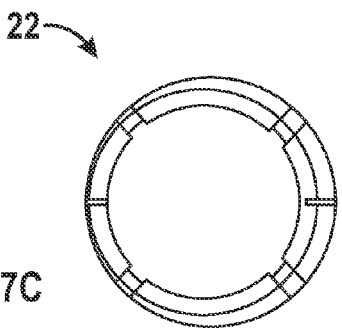
Figure 7D:
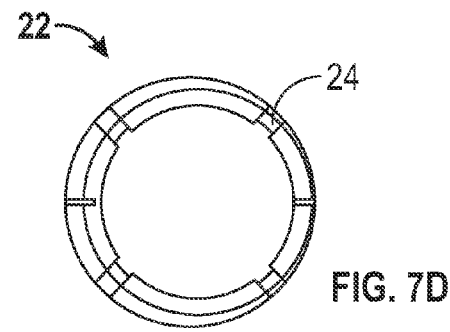
Figure 7E:
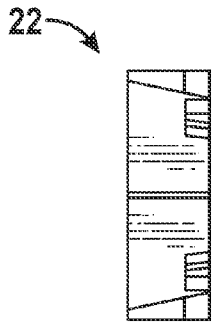
Figure 7F:
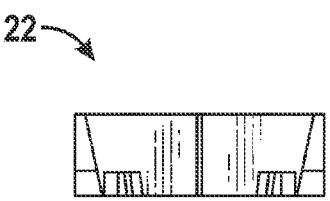

The pivot system 10 may replace the pin 10 with the axle assembly 11 shown in FIGS. 1-4. The axle assembly 11 may have an axle 30. A channel 32 may be formed through the axle 30. A pin 34 may be positioned in the channel 26.

Sleeve members 22 may be positioned over each end of the axle assembly 11. The sleeves 22 may be seated in the opening of the lug ears 18. The sleeve member 22 has a tapered body section 22A having open ends. The sleeve member 22 is designed to have a taper such that the sleeve member 22 is slightly conical in shape. The sleeve members 22 may be designed to lock onto each end of the axle assembly 11.

Each sleeve member 22 may have a plurality of slots 24 formed therein around a perimeter of each sleeve member 22. In accordance with one embodiment, each slot 24 may be a cut-out which penetrates no more than half of a height of the sleeve member 22. The slots 24 allow one to rotate each sleeve member 22.

Each sleeve member 22 may further have a plurality of slits 26 formed around a perimeter thereof. Some of the slits 26 may run a length of the sleeve member 22. Other of the slits 26 may run only a portion of the length of the sleeve member 22. The slits 26 may be used to allow the sleeve member 22 to expand to secure the pins 20 in place.

A locking device 28 may be used on the axle assembly 11. The locking device 28 maybe used to apply pressure on the sleeve member 22. The pressure causes the sleeve member to expand to secure the axle assembly 11 in place. While the Figures show one locking device 28, a locking device 28 may be positioned on each end of the axle assembly 11.

In accordance with one embodiment, the locking device 28 may be the pin 34 having a threaded section 34A. A threaded opening 36 may be formed in the channel 32 of the axle 30 to secure the threaded section 34A of the pin 34. The threaded section 34A of the pin 34 may engage the threaded opening. When sufficient torque is applied, the locking device 28 applies pressure to and causes the sleeve member 22 to expand. In accordance with one embodiment of the present invention, a washer 31 or similar device may be placed between the locking device 28 and the sleeve member 22 to apply pressure to the sleeve member 22 when torque is applied.

The axle assembly 11 is designed to eliminate the freedom of movement in the lug ears 18 through expansion of the sleeve member 22 by one of the diameter being tapered and forced over or into the tapered end of the axle assembly 11 or the tapered hole in the lug-ear 18.

The above design provides for an adjustment range of the center line of the cylindrical pin twice the amount of the off-set of the diameters. The adjustment is achieved through rotating the bushing/sleeve until complete alignment is achieved. Each pin normally has two lug-ears that hold the pin, rotating one of the sleeves more or less than the companion sleeve results in angular alignment as well.

The rotation of the sleeve/bushing can be facilitated through many means, from having flats allowing a wrench to be used or a spanner wrench through a notch in the sleeve or bushing.

If the locking type of sleeve is used this will produce a fully aligned, locked in-place pivot pin without any of the traditional compromises of miss-aligned lug-ears holes or bearings on multiple pin pivot junctions.

While embodiments of the disclosure have been described in terms of various specific embodiments, those skilled in the art will recognize that the embodiments of the disclosure may be practiced with modifications within the spirit and scope of the claims.

What is claimed is:

1. A multi-pivot pin system comprising:
    a hinge assembly having a plurality of housings formed within the hinge assembly;
    a channel formed through each housing wherein an outer diameter center-line of the hinge assembly is off-set from a center-line of an inner diameter of the channel;
    a rotating device positioned in the channel; and
    an axle assembly positioned in at least one channel.

2. The multi-pivot pin system of claim 1, wherein the hinge assembly comprises:
    a base member having the plurality of housings; and
    a hinged member having a plurality of leg members, the leg members positioned in each housing.

3. The multi-pivot pin system of claim 1, wherein each housing comprising a pair of lug ears.

4. The multi-pivot pin system of claim 1, wherein the rotating device is one of a bearing or a bushing.

5. The multi-pivot pin system of claim 4, further comprising an axle assembly positioned in the one of a bearing or a bushing.

6. The multi-pivot pin system of claim 5, wherein the axle assembly comprises:
    an axle having a channel;
    a pin positioned through the channel; and
    a sleeve member positioned on each end of the axle assembly, wherein each sleeve member is positioned in one of the housings.

7. The multi-pivot pin system of claim 6, wherein the sleeve member comprises:
    a tapered body section having open ends; and
    a plurality of slots formed around a perimeter of one of the open ends.

8. The multi-pivot pin system of claim 7, wherein each sleeve member further comprises a plurality of slits formed through the sleeve member around a perimeter of the sleeve member.

9. The multi-pivot pin system of claim 6, further comprising a locking device to apply pressure on the sleeve.

10. The multi-pivot pin system of claim 9, further comprising a washer.

11. The multi-pivot pin system of claim 1, wherein the rotating device comprises:
    a bushing positioned in each channel; and
    a pin positioned through each bushing.

12. A multi-pivot pin system comprising:
    a hinge assembly having a plurality of housings formed within the hinge assembly wherein the hinge assembly comprises:
    a base member having the plurality of housings; and
    a hinged member having a plurality of leg members;
    a plurality of pair of lug ears on the hinged member, wherein each pair of lug ears form a housing, the leg members positioned in each housing;

a channel formed through each housing wherein an outer diameter center-line of the hinge assembly is off-set from a center-line of an inner diameter of the channel;
a rotating device positioned in the channel; and
an axle assembly positioned in at least one channel.

13. The multi-pivot pin system of claim 12, wherein the rotating device is one of a bearing or a bushing.

14. The multi-pivot pin system of claim 13, further comprising an axle assembly positioned in the one of a bearing or a bushing.

15. The multi-pivot pin system of claim 14, wherein the axle assembly comprises:
an axle having a channel;
a pin positioned through the channel; and
a sleeve member positioned on each end of the axle assembly, wherein each sleeve member is positioned in one of the housings.

16. The multi-pivot pin system of claim 15, wherein the sleeve member comprises:
a tapered body section having open ends; and
a plurality of slots formed around a perimeter of one of the open ends.

17. The multi-pivot pin system of claim 16, wherein each sleeve member further comprises a plurality of slits formed through the sleeve member around a perimeter of the sleeve member.

18. The multi-pivot pin system of claim 15, further comprising a locking device to apply pressure on the sleeve.

19. The multi-pivot pin system of claim 18, further comprising a washer.

20. The multi-pivot pin system of claim 12, wherein the rotating device comprises:
a bushing positioned in each channel; and
a pin positioned through each bushing.

\* \* \* \* \*